US008849514B2

(12) United States Patent
Sugawara et al.

(10) Patent No.: US 8,849,514 B2
(45) Date of Patent: Sep. 30, 2014

(54) DRIVING SUPPORT DEVICE

(75) Inventors: Toshiharu Sugawara, Hitachinaka (JP); Atsushi Yokoyama, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 411 days.

(21) Appl. No.: 13/123,373

(22) PCT Filed: Oct. 6, 2009

(86) PCT No.: PCT/JP2009/067375
§ 371 (c)(1),
(2), (4) Date: Jun. 10, 2011

(87) PCT Pub. No.: WO2010/041640
PCT Pub. Date: Apr. 15, 2010

(65) Prior Publication Data
US 2011/0276227 A1    Nov. 10, 2011

(30) Foreign Application Priority Data

Oct. 10, 2008   (JP) .................................. 2008-263373

(51) Int. Cl.
| A01B 69/00 | (2006.01) |
| B62D 6/00 | (2006.01) |
| B62D 11/00 | (2006.01) |
| B60T 8/1755 | (2006.01) |
| B60T 7/22 | (2006.01) |
| B60T 7/04 | (2006.01) |
| B62D 15/02 | (2006.01) |
| B60W 30/12 | (2006.01) |

(52) U.S. Cl.
CPC .......... B60W 30/12 (2013.01); *B60T 2201/083* (2013.01); *B60T 8/17557* (2013.01); *B60T 7/22* (2013.01); *B62D 6/003* (2013.01); *B60T 2201/087* (2013.01); *B60T 8/17558* (2013.01); *B60W 2720/14* (2013.01); *B60T 7/042* (2013.01); *B62D 15/0265* (2013.01); *B62D 15/025* (2013.01)
USPC ................ 701/41; 701/48; 701/301; 303/146

(58) Field of Classification Search
USPC ......... 701/1, 2, 23, 24, 301, 41, 43, 4, 48, 70, 701/804; 434/65, 66; 340/435, 441; 303/146
See application file for complete search history.

(56) References Cited

U.S. PATENT DOCUMENTS

| 6,138,062 A | 10/2000 | Usami |
| 7,016,783 B2 * | 3/2006 | Hac et al. ...................... 701/301 |

(Continued)

FOREIGN PATENT DOCUMENTS

| JP | 2000-108866 A | 4/2000 |
| JP | 2004-243904 A | 9/2004 |

(Continued)

OTHER PUBLICATIONS

European Search Report dated Mar. 27, 2012 (six (6) pages).

(Continued)

*Primary Examiner* — Tuan C. To
*Assistant Examiner* — Isaac Smith
(74) *Attorney, Agent, or Firm* — Crowell & Moring LLP

(57) ABSTRACT

A conventional brake control can generate only a small yaw moment compared with a steering control, so that reliable avoidance of obstacles cannot be obtained. With a steering control, the driver gets behind the wheel every time when crossing a lane and has an uncomfortable feeling. To solve these problems, a traveling aid device comprises: a detection unit for detecting the traveling state of a vehicle, the position of a lane marker, and the positions and types of obstacles around the vehicle; a calculation unit for calculating, based on the traveling state of the vehicle, the position of the lane marker, and the positions and types of the surrounding obstacles, a target yaw moment so as to prevent a departure from the lane marker and a collision with the surrounding obstacles; and a distribution unit for distributing, based on at least one of the traveling state of the vehicle, the position of the lane marker, and the positions and types of the surrounding obstacles, the target moment to a first actuator for controlling the driving/braking force and a second actuator for controlling the steering.

20 Claims, 15 Drawing Sheets

(56) References Cited

U.S. PATENT DOCUMENTS

| | | | |
|---|---|---|---|
| 7,062,382 B2 * | 6/2006 | Courtenay et al. | 701/301 |
| 7,212,896 B2 * | 5/2007 | Coelingh et al. | 701/48 |
| 2005/0071084 A1 | 3/2005 | Knoop et al. | |

FOREIGN PATENT DOCUMENTS

| | | |
|---|---|---|
| JP | 2005 178743 A | 7/2005 |
| JP | 2005-178743 A | 7/2005 |
| JP | 2005-324782 A | 11/2005 |
| JP | 2006-206032 A | 8/2006 |
| JP | 2006-306203 A | 11/2006 |
| JP | 2006 306203 A | 11/2006 |
| JP | 2006-327356 A | 12/2006 |
| JP | 2007 099237 A | 4/2007 |
| JP | 2007-99237 A | 4/2007 |
| JP | 2007099237 A * | 4/2007 |
| JP | 2007-253745 A | 10/2007 |
| WO | WO 2008/117885 A1 | 10/2008 |

OTHER PUBLICATIONS

Corresponding International Search Report dated Nov. 24, 2009 (Two (2) pages).

JP Office Action, dated Jul. 31, 2012 and translation thereof (five (5) pages).

* cited by examiner

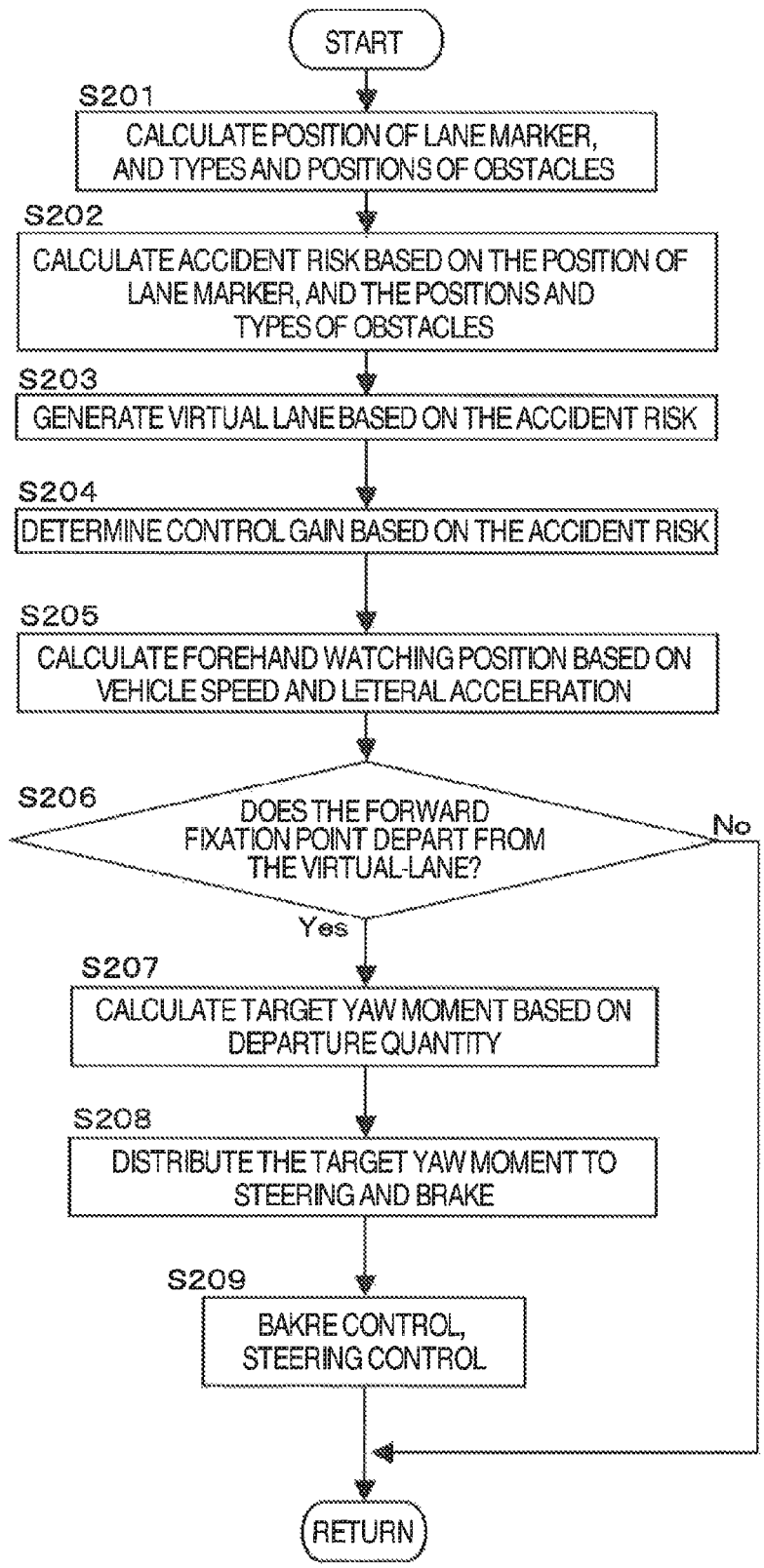

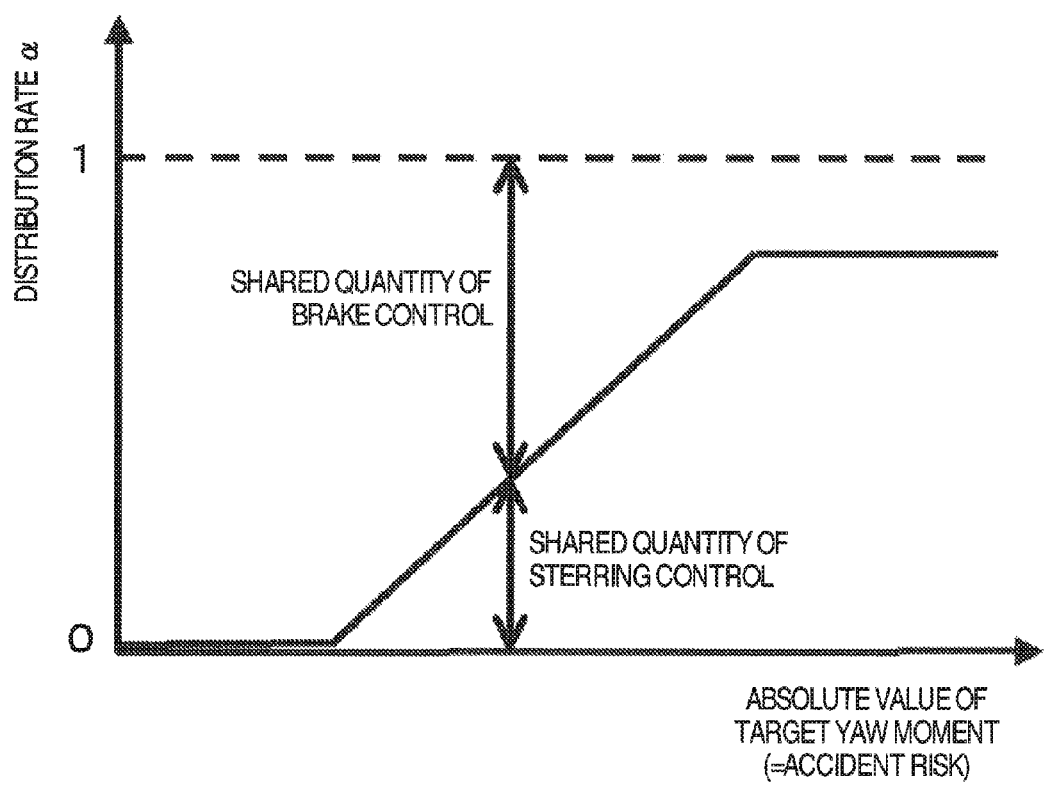

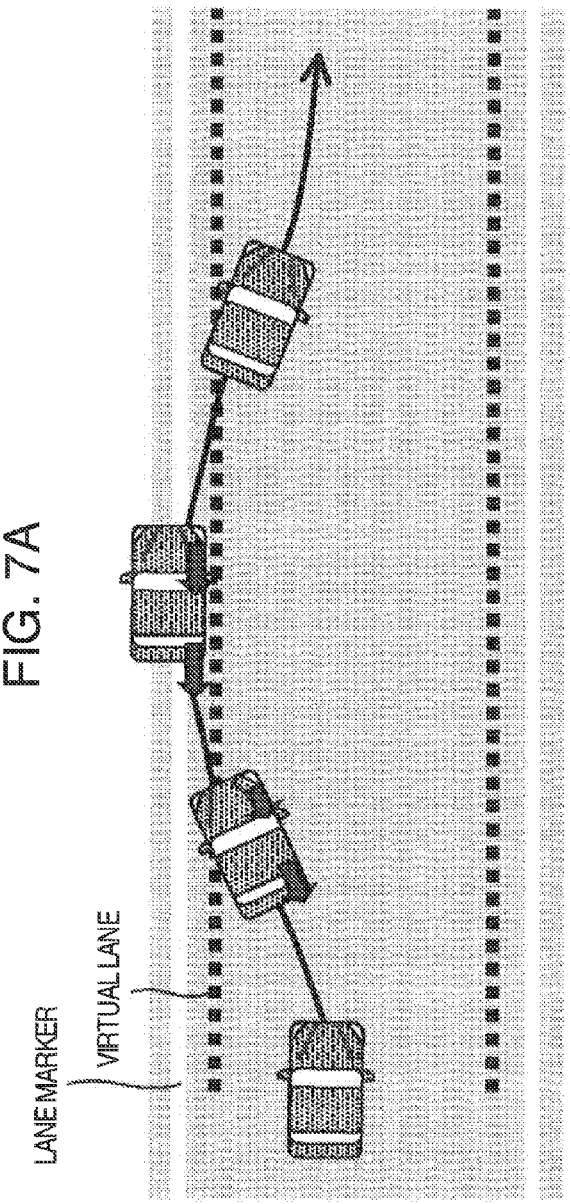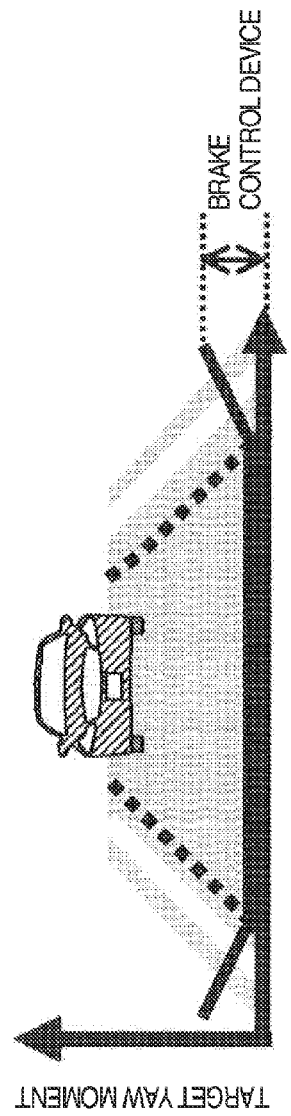

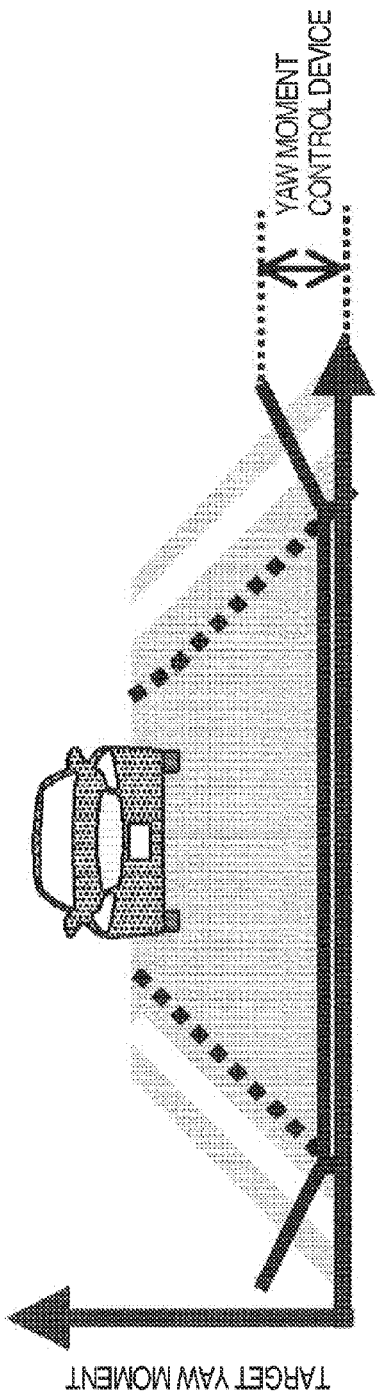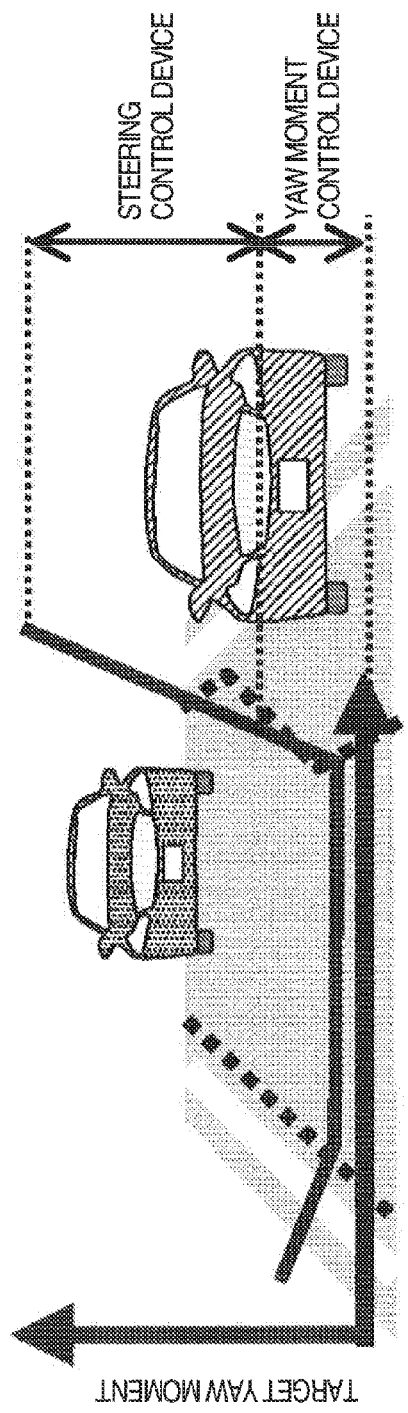

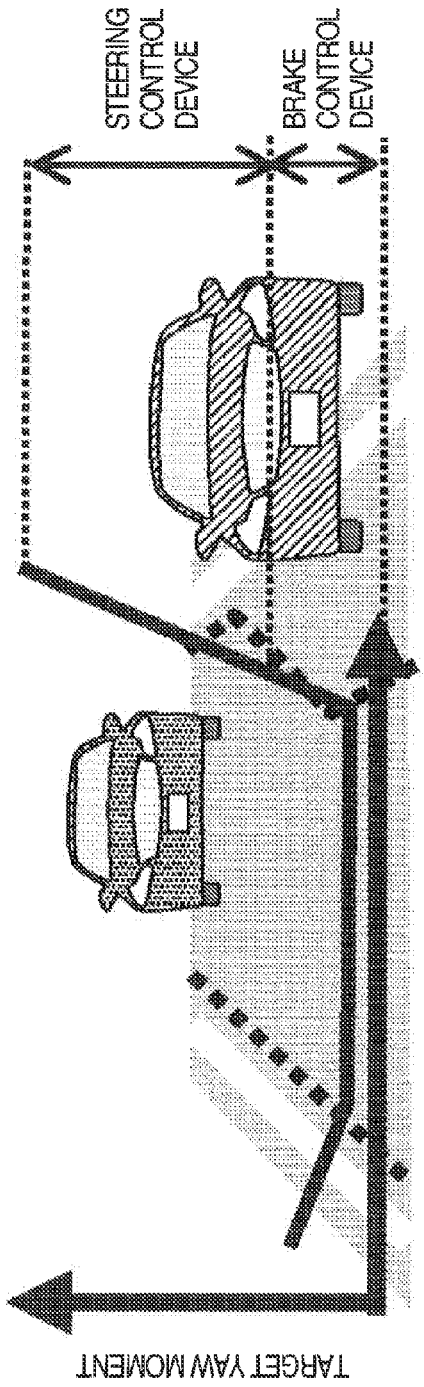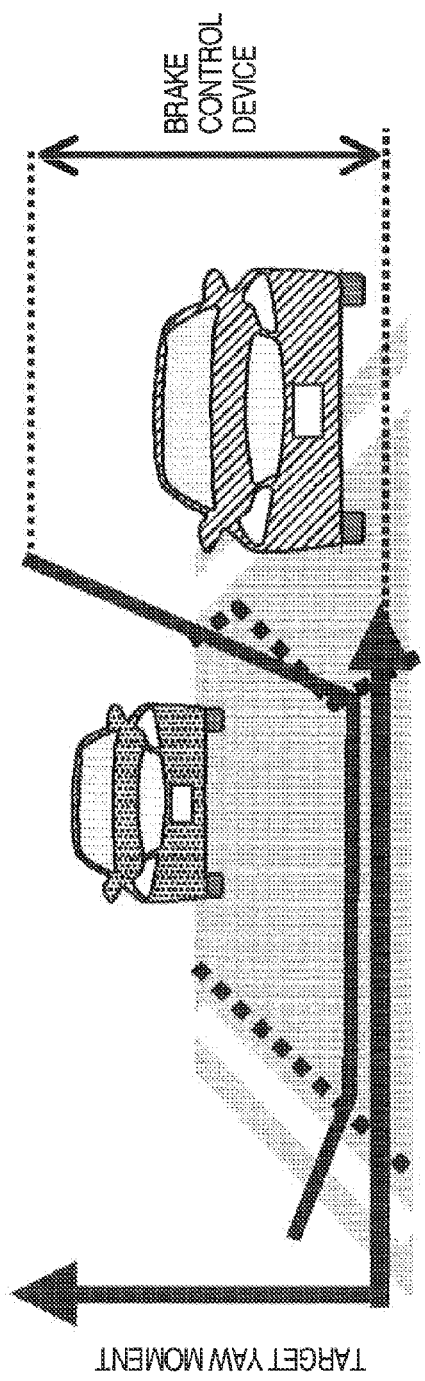

DRIVING SUPPORT DEVICE

TECHNICAL FIELD

The present invention relates to a driving support device for vehicles.

BACKGROUND ART

In the conventional art, there is a technology that when a vehicle may depart from a driving lane, a braking force to wheels of the vehicle is controlled to apply a yaw moment to the vehicle, thereby preventing the departure of the vehicle from the driving, and notifying the driver of the possibility of vehicle's departure from the driving lane due to applying of the yaw moment (refer to Patent Literature 1). The Patent Literature 1 discloses that taking forward obstacles such as a parked vehicle or the like into account, a control quantity of the lane departure prevention control (threshold for departure prevention control) is changed depending upon an obstacle on the shoulder of a road, so as to carry out a lane departure prevention control.

CITATION LIST

Patent Literature

Patent Literature 1: JP-A-2005-324782

SUMMARY OF INVENTION

Technical Problem

The Patent Literature 1 describes the control using a brake or a steering. However, it does not describe the control by changing the distribution of use for the brake and the steering in accordance with the driving state of a vehicle and the situation around the vehicle. As a result, there is a problem to be solved such that when the vehicle is controlled by only the brake, the lane departure may be prevented without an uncomfortable feeling, but, the brake control cannot generate anything but a yaw moment smaller than that in the steering control, so that reliable avoidance of obstacles cannot be obtained. Conversely, if controlled by only the steering, there is a problem to be solved such that control of the steering wheel is lost every time when crossing a lane, so that the driver has an uncomfortable feeling.

Therefore, an object of the present invention is to provide a driving support device in which avoidance of obstacles is compatible with reduction of an uncomfortable feeling at a departure from a lane.

Solution to Problem

In order to solve the above-mentioned problems one of desirable aspects of the present invention is as follows.

A driving support device according to the invention comprises a detection unit for detecting the driving state of a vehicle, the position of a lane marker, and the positions and types of obstacles around the vehicle; a calculation unit for calculating, based on the driving state of the vehicle, the position of the lane marker, and the positions and types of the surrounding obstacles, a target yaw moment so as to prevent a departure from the lane marker and a collision with the surrounding obstacles; and a distribution unit for distributing, based on at least one of the driving state of die vehicle, the position of the lane marker and the positions and types of the surrounding obstacles, the target moment to a first actuator for controlling the driving/braking force and a second actuator for controlling the steering.

Advantageous Effects of Invention

In accordance with the present invention, it provides a driving support device in which avoidance of obstacles is compatible with reduction in an uncomfortable feeling at a departure from a lane.

Other objects, features and advantages of the invention will become apparent from the following description of the embodiments of the invention taken in conjunction, with the accompanying drawings.

BRIEF DESCRIPTION OF DRAWINGS

FIG. 2 is a flowchart of an integrated control device in Embodiments 1, 2, 3 and 4.

FIG. 6 is a diagram showing a distribution ratio of a target yaw moment in Embodiment 1.

FIG. 7A shows a control operation when the accident risk is small in Embodiment 1.

FIG. 7B shows a distribution of a target yaw moment when the accident risk is small in Embodiment 1.

FIG. 11A shows a distribution of a target yaw moment when the accident risk is small in Embodiment 2.

FIG. 11B shows a distribution of a target yaw moment when the accident risk is large in Embodiment 2.

FIG. 13A shows a distribution of a target yaw moment when an accident risk other than that during a high-speed driving is large in Embodiment 3.

FIG. 13B shows a distribution of a target yaw moment when an accident risk during a high-speed driving is large in Embodiment 3.

DESCRIPTION OF EMBODIMENTS

In the following, description of embodiments according to the invention will be made with reference to the drawings.

Embodiment 1

Figure 1:
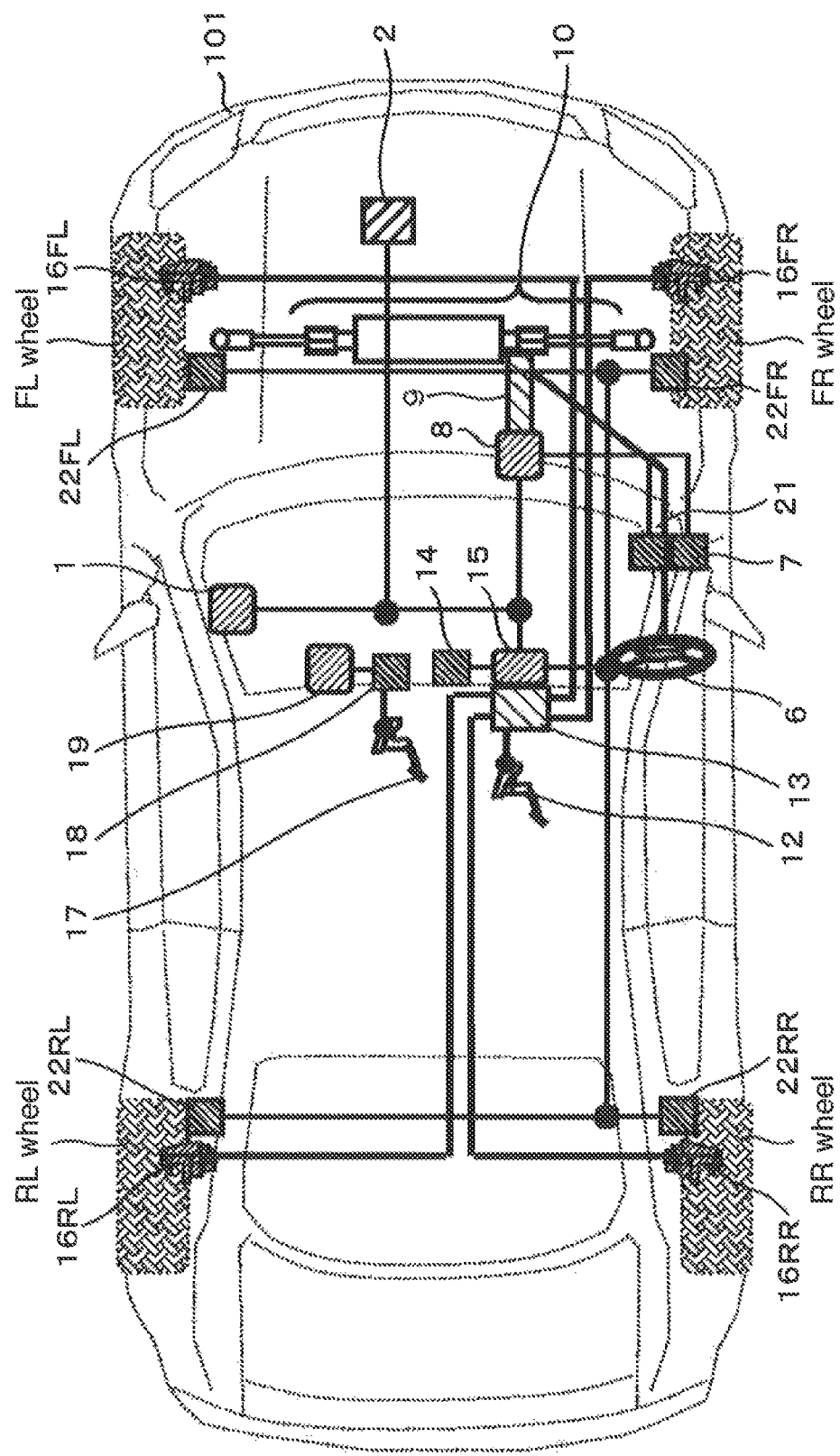
FIG. 1 is a systematic diagram showing a driving support device in Embodiments 1, 3 and 4.

FIG. 1 is a diagram showing a driving support device, in which FL wheel denotes a front left wheel, FR wheel denotes a front right wheel RL wheel denotes a rear left wheel, and RR wheel denotes a rear right wheel, respectively. The driving support device 101 includes a sensor 2 which identifies the front of a vehicle, various types of actuators for supporting a driving based on information acquired by said sensor (a steering control mechanism 10, a brake control mechanism 13), an integrated control, device 1 which arithmetically operates instruction values for said various types of actuators, a steering control device 8 which controls the steering control mechanism 10 based on the instruction value from said integrated control device 1, and a brake control device 15 which controls the brake control mechanism 13 based on said instruction value to adjust distribution of braking forces to the respective wheels. The integrated control device 1, the steering control mechanism 10 and the brake control device 15 are connected through an in-vehicle network such as a CAN (Controller Area Network) or the like. However, the configuration of the actuators is not limited to the above. The actuator configuration may be combined with a driving force control device (not shown) and a yaw moment generating mechanism such as a yaw moment control device 25 shown in Embodiment 2 or the like.

The sensor 2 identifies the position of a forehand lane marker and obstacles around the vehicle (such as a parked vehicle, walker, bicycle, guardrail, curb stone or the like). A sensor signal of the sensor 2 is input to the integrated control mechanism 1. The sensor 2 is formed of, for example, a monocular camera, stereo camera, laser radar, millimeter-wave radar or the like.

Next, the operation of the brake will be described. A driver's depressing force to a brake pedal 12 is boosted by using a brake booster (not shown), and an oil pressure according to the boosted force is generated by a master cylinder (not shown). The generated oil pressure is fed to wheel cylinders 16 through the brake control mechanism 13. Wheel cylinders 16FL, 16FR, 16RL and 16RR are formed of pistons (not shown) and pads (not shown) and so on. The piston, is propelled by an actuating liquid fed from the master cylinder, and the pad connected with the piston is depressed against a disc rotor (not shown). Since the disc rotor is rotating together with the wheel, a brake torque acting on the disc rotor serves as a braking force acting on between the wheel and the road surface. For the above-mentioned configuration, a braking force is generated to each of the wheels in accordance with the brake-pedal operation by the driver.

To the brake control device 15 are input a sensor signal from a combined sensor 14 (detectors of Longitudinal acceleration, lateral acceleration and yaw rate), sensor signals from wheel speed sensors 22FL, 22FR, 22RL and 22RR provided to respective wheels, a target yaw moment from the integrated control device 1 and a sensor signal from a steering angle detector 21 through the steering control device 8. Instructions of the brake control device 15 are output to the brake control mechanism 13 including a pump (not shown) and a control valve (not shown), and any braking force can be generated to each wheel independently from driver's brake-pedal operation. In addition, the brake control device 15 estimates vehicle's spin, drift-out and wheel's lock based on the above-mentioned information, severs to generate a braking force to the relevant wheel, so as to suppress those behaves, thus playing a role to enhance stability of driver's operation. The integrated control device 1 transmits the target yaw moment to the brake control device 15, thereby braking one of the left and right wheels to make it possible to generate a desired yaw moment. However, the embodiment is not limited to the above-mentioned brake control device. Alternatively, another actuator such, as a brake-by-wire or the like may be used.

Next, the operation of the steering will be described. A steering torque detector 7 and a steering angle detector 21 detect a steering torque and a steering angle input by the driver through a handle 6, respectively, and based on the above information the steering control device 8 controls a motor 9 to generate an assist torque. The steering control mechanism 10 is made to be activated by a combined force of the driver's steering torque and the assist torque by the motor 9, so that the front wheels are turned (make a turn). On one hand, a reaction force from the road surface is transmitted to the steering control mechanism 10 in accordance with a turn angle of the front wheels, and is thus transmitted to the driver as a road surface reaction force.

The steering control device 8 can generate a torque by the motor 9 independently of driver's steering operation to thereby control the steering control mechanism 10. Accordingly, the steering control device 8 can generate a desired target yaw moment by controlling the steering angle in order to achieve the target yaw moment of the integrated control device 1. However, the above-mentioned control of steering is not limited to the steering angle control, and may be made by torque control according to the target yaw moment of the integrated control device 1. Another actuator such as a steer-by-wire may be used.

Next, description will be made of an accelerator. A depression quantity of a driver's accelerator pedal 17 is detected by a stroke sensor 18 and is input to an engine control device 19. The engine control device 19 adjusts the opening degree of a throttle, the quantity of fuel injection and so on in accordance with the above-mentioned depression quantity of the accelerator pedal, for engine control. By the configuration mentioned above, the vehicle can be accelerated in accordance with the driver's operation of accelerator pedal. The brake control device 15, the steering control device 8 and the engine control device 19 include a CPU, ROM, RAM and so on.

By foregoing the steering control device and the brake control device can generate desired yaw moments respectively, based on the target yaw moments which the integrated control device 1 has distributed.

In FIG. 2, a flowchart of the traveling aid device is shown. The flow chart of FIG. 2 is executed repeatedly at a predetermined period. In S201, the sensor 2 identifies the position of a lane marker and the positions and types of obstacles around a vehicle (parked vehicle, walker, bicycle, guardrail, curb and so on). Subsequently, in S202, the integrated control device 1 calculates the risk of an accident based on said lane marker position and said positions and types of obstacles.

Figure 3A:
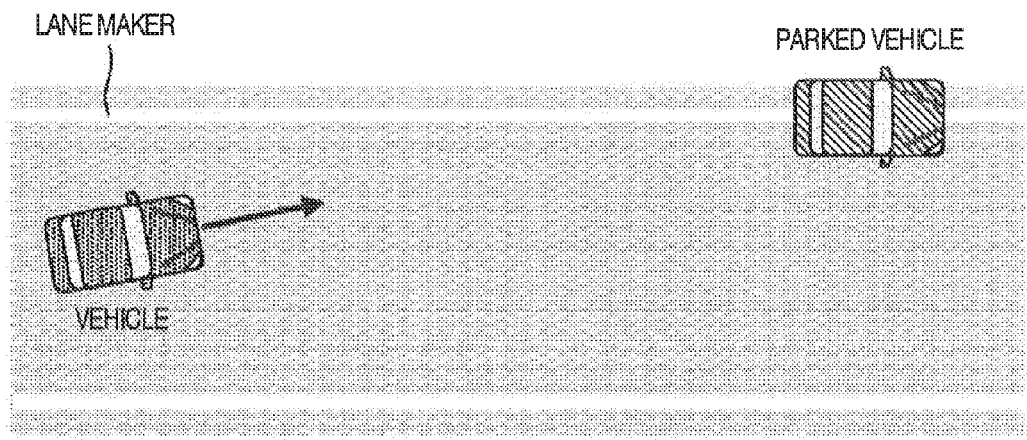
FIG. 3A is as illustration showing a driving situation in Embodiments 1, 2, 3 and 4.
Figure 3B:
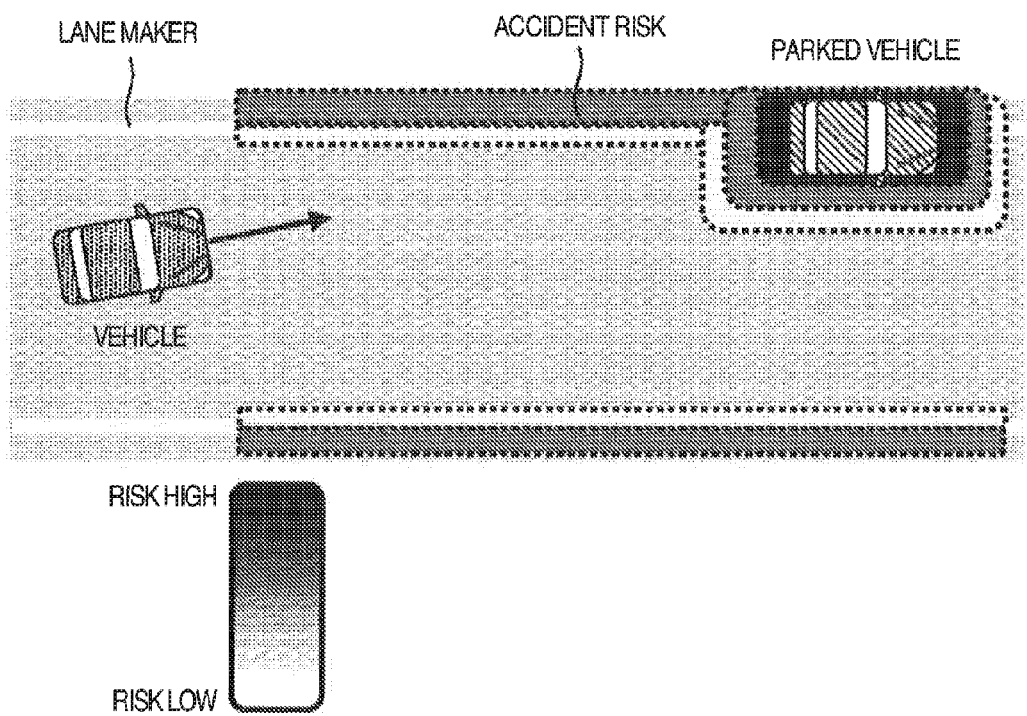
FIG. 3B is an illustration showing an accident risk in the driving situation in Embodiments 1, 2, 3 and 4.
Figure 4:
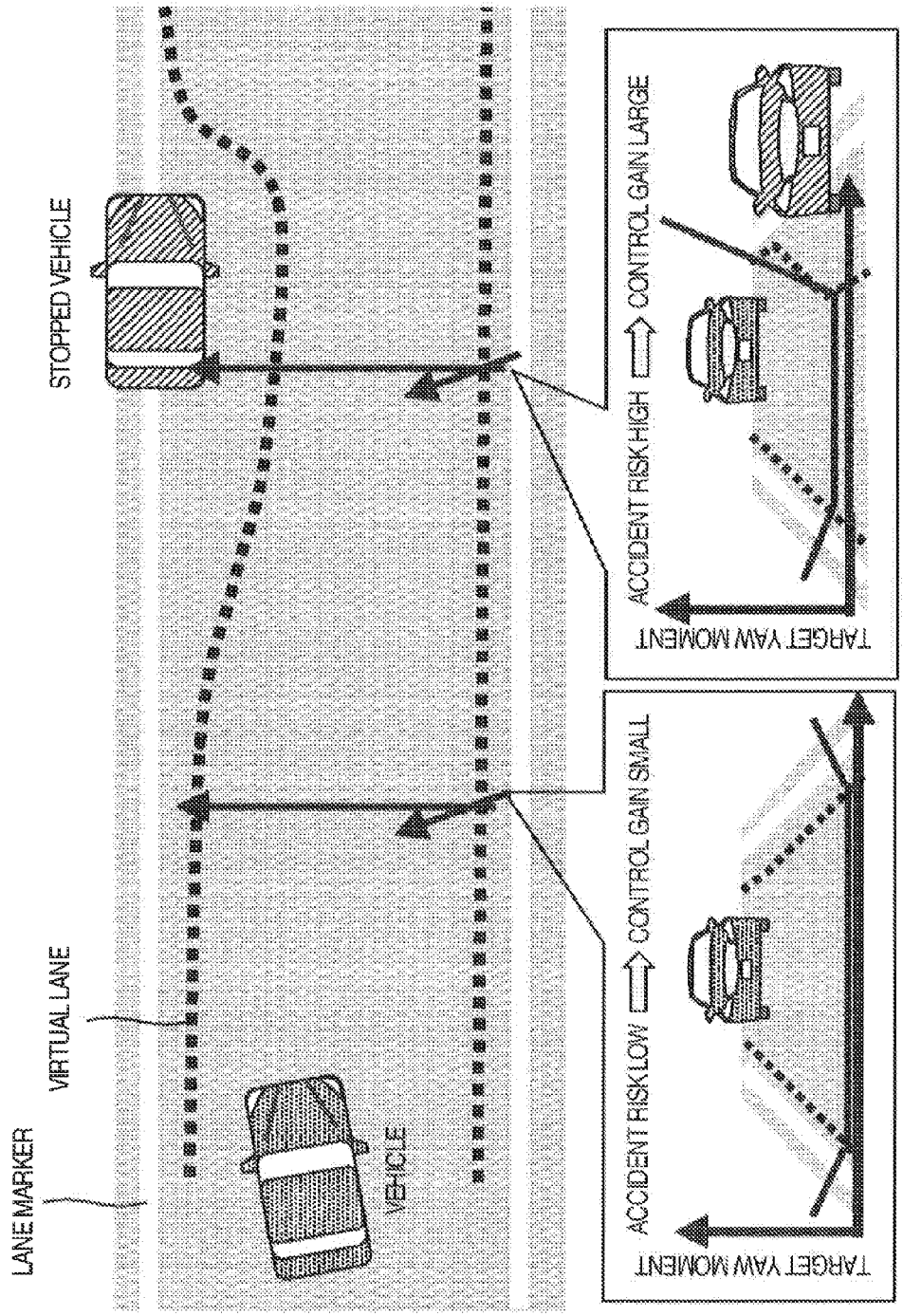
FIG. 4 is an illustration showing a virtual lane and control gains in Embodiments 1, 2, 3 and 4.

Here, FIG. 3A and FIG. 3B show calculation examples of accident risk. FIG. 3A shows a driving situation and FIG. 3B shows an accident risk in the situation. The integrated control device 1 assumes a departure of the vehicle from a white line as an accident risk, and sets it to be a small accident risk compared with that of the parked vehicles. The integrated control device 1 also assumes that a collision with another vehicle is high is accident risk, and is set to be a large accident risk compared with the departure from white line. Subsequently, the integrated control device 1 generates a virtual lane on which the vehicle can drive safely, by connecting ends of smaller sides of said accident risks smoothly as shown in FIG. 4 in S203, where the inside of the virtual lane is a region which allows the vehicle to freely drive. Furthermore, the vehicle can be placed almost free from an accident risk by applying a yaw moment to the vehicle so as not to depart from the virtual lane.

Next, the integrated control device 1 sets a control gain in accordance with an accident risk as shown in FIG. 4 in S204. The integrated control device 1 sets the control gain to be small for a departure from the white line which is small in accident risk, and sets the control gain to be large for the vicinity of parked vehicle which is large in accident risk. Thus, by setting the control gain according to the accident risk, a large yaw moment can be applied to the vehicle when the accident risk such as avoidance of a collision with the parked vehicle is large. Further, the virtual lane generating method and the control gain setting method are not limited to the above-mentioned manners. Alternatively, the position of the virtual lane and the control gain may be set directly based on said position of lane marker and said positions and types of obstacles. Further, the control gain may be set in accordance with the type of the lane marker.

Figure 5:
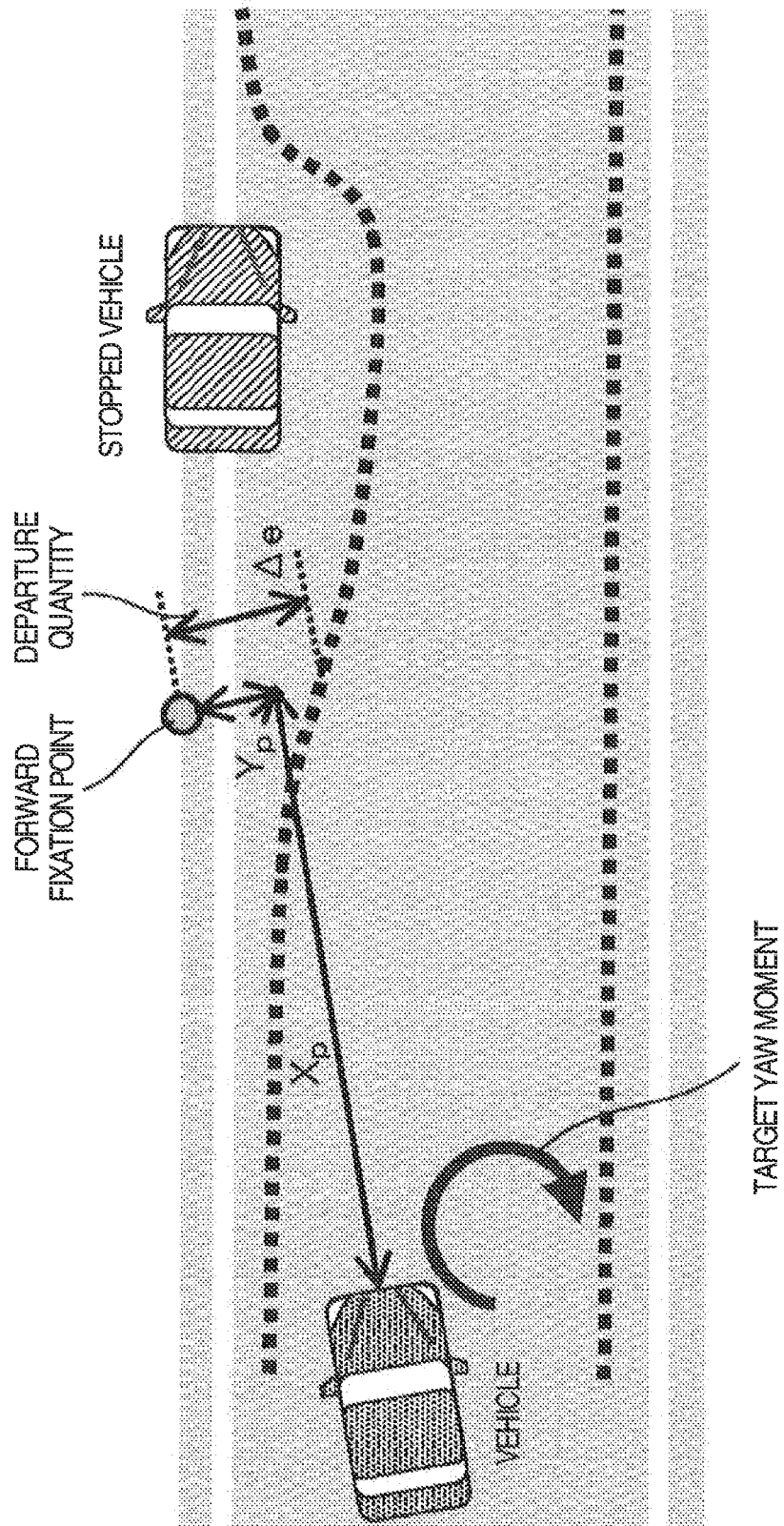
FIG. 5 is an illustration showing a method for calculating target yaw moments in Embodiments 1, 2, 3 and 4.

Next, the integrated control device 1 calculates a forward fixation point which is a key point in control in S205 as shown in FIG. 5. To this end, a vehicle speed Vx is at first estimated based on information detected by the wheel speed sensors 22. For example, the highest value among the speeds of the tour wheel speed sensors may be determined as the vehicle speed. Alternatively, the vehicle speed may be defined by an average speed value of the wheel speed sensors or may be defined by other methods.

Next, the forward fixation point is determined. The forward fixation point is assumed as a forward point proportional to the vehicle speed Vx. The distance between the vehicle and the forward point is assumed as a forward fixation distance $X_p$. Assuming that the time at which the vehicle arrives at the forward fixation point P is tp seconds, a moving distance $Y_p$ of the vehicle in a lateral direction after lapse of tp seconds is predicted. Taking the lateral movement into account, the forward fixation point P is a point which is distant by $X_p$ ahead of the vehicle and offsets by $Y_p$ in vehicle's lateral direction, if the steering angle is zero, the vehicle travels by Vx×tp forwardly and the moving distance $Y_p$ in the lateral direction becomes zero. If the lateral acceleration of the vehicle is ay, the moving distance $Y_p$ in the lateral direction can be predicted to be ay×$\Delta t^2$/2. The lateral acceleration can also be determined as ay=Vx×r using yaw rate information r of vehicle motion sensor. Alternatively, if the steering angle is δ, the lateral acceleration can be determined ay=Vx×f(δ) as well, where f(δ) is a function for determining the steering angle δ and the yaw rate r, and is derivable using a vehicle motion model. Those determinations may be made based on a more accurate analytical expression without using these procedures.

Subsequently, the integrated control device 1 judges whether the forward, fixation point in S206 departs from the virtual lane or not. When it does not depart from the virtual lane, the process proceeds to a return process, and returns back to the start step. On the other hand, if it departs from the virtual lane, the process proceeds to S207. In S207, the integrated control device 1 calculates a target yaw moment M based on a departure quantity Δe from the virtual lane of the forward fixation point, from an expression (1) (FIG. 5).

$$M = \begin{bmatrix} \text{sgn}(K_p + sK_d)\Delta e & (\Delta e > 0) \\ 0 & (\Delta e < 0) \end{bmatrix} \quad (1)$$

where $K_p$ and $K_d$ indicate a proportional gain and a differentiation gain, respectively, and s indicates a Laplace operator. Sgn is a function that expresses −1 when departs from a virtual lane to a left side and expresses 1 when departs from a virtual lane to a right side. The departure quantity Δe is assumed to be positive when the vehicle departs from the virtual lane and the yaw moment is assumed to be positive at its left turn.

Subsequently, the integrated control device 1 distributes the whole target yaw moment to a target yaw moment $M_{steer}$ of the steering control device and a target yaw moment $M_{brake}$ of the brake control device based on expressions (2) and (3) in S208.

$$M_{steer} = \alpha M \quad (2)$$

$$M_{brake} = (1-\alpha)M \quad (3)$$

where α indicates a rate of distribution of the target yaw moment. The integrated control device 1, as shown in FIG. 6, makes larger the distribution of the target yaw moment of the steering control device 8 to the target yaw moment of the brake control device 15 as the absolute value of the target yaw moment becomes larger.

Figure 8A:
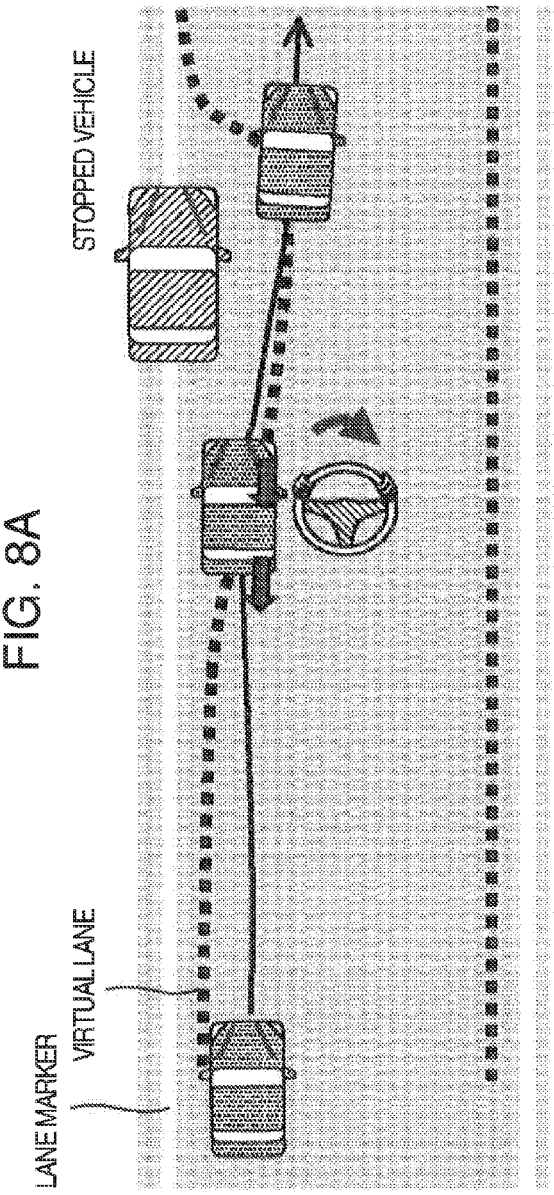
FIG. 8A shows a control operation when the accident risk is large in Embodiment 1.
Figure 8B:
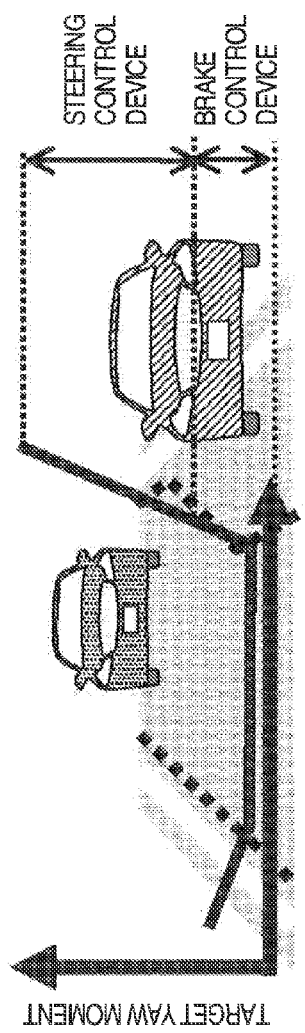
FIG. 8B shows a distribution of a target yaw moment when the accident risk is large in Embodiment 1.

As a result, as shown in FIG. 7A and FIG. 7B, the target yaw moment is distributed to the brake control device 15 when the accident risk is small as in the departure from lane, that is, when the absolute value of the target yaw moment is small. On the other hand, as in shown in FIG. 8A and FIG. 8B, when the accident risk is large as in avoidance of a collision with a parked vehicle, that is, when the absolute value of the target yaw moment is large, the target yaw moment to the steering control device 8 is distributed at a rate larger than when the accident risk is small. Based on the respective target yaw moments obtained in the manner mentioned above, the steering control device 8 and the brake control device 15 control the respective actuators to generate desired yaw moments (S209).

In the foregoing manner, the driving support device 101 serves to generate a yaw moment through brake control in the departure from a lane of which the frequency is high in a daily life. As a result, vehicle's departure from lane can be prevented while an uncomfortable feeling of the steering caused due to steering control is reduced. On the other hand, by increasing the rate of the target yaw moment of the steering control device 8 in the avoidance of collision with parked vehicle, reliable avoidance of collision can be obtained. That is, the driving support device 101 can distribute the target yaw moment to the steering control device 8 and the brake control device 15 suitably in accordance with the surrounding situation, and realization of the reliable avoidance of collision is compatible with reduction of uncomfortable feeling at the departure from lane.

It is desirable to set the maximum values of target yaw moments of the respective actuators so as not to exceed generation capabilities of yaw moments of the respective actuators.

In Embodiment 1, the target yaw moment is calculated, and after then distribution of the target yaw moments to the respective actuators is determined. Alternatively, a target yaw moment required in the future can be predicted based on a vehicle speed, a steering angle and an angle at which the vehicle departs from a virtual lane, and distribution of the target yaw moment to the actuators can be determined based on the absolute value of the predicted target yaw moment using FIG. 6. By doing so, for example, when the angle of the vehicle under fast driving which departs from the virtual lane is large, it is judged that the vehicle requires a large target yaw moment. As a result, from the stage of starting to generate the target yaw moment, that is, from the stage at which the forward fixation point begins to depart from the virtual lane, the rate of the target yaw moment of the steering control may be set to be large, thereby realizing safer avoidance of collision than the case of no prediction.

Embodiment 2

Figure 9:
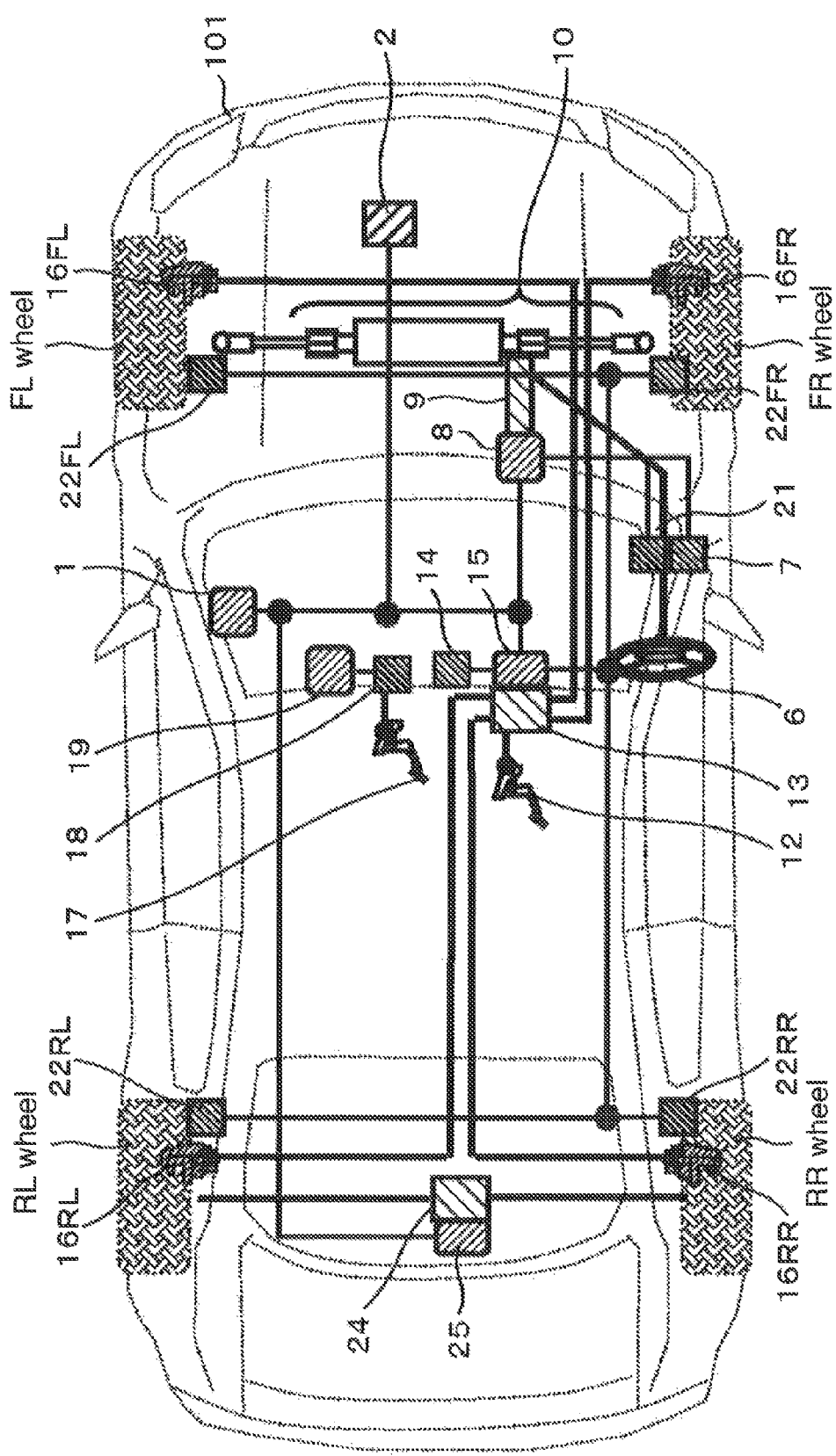
FIG. 9 is a systematic diagram showing a driving support device in Embodiment 2.

In the following, Embodiment 2 will be described with reference to the drawings. FIG. 9 shows a system configuration. In Embodiment 2, a yaw moment control mechanism 24 and a yaw moment control device 25 are substituted for the brake control mechanism 13 and the brake control device 15 in Embodiment 1. Here are described only portions which differ from Embodiment 1 and the description of like portions will be omitted hereafter.

The integrated control device 1, the steering control device 10 and the yaw moment control device 25 are connected through an in-vehicle network such as CAN or the like.

Description will be made of the yaw moment control mechanism 24. The yaw moment control mechanism 24 connects planetary gear arranged in multiple row (not shown) between the left and right wheels. By inputting a motor torque to one of the planetary gears, opposite torques can be generated to the left and right wheels by only one motor (not shown). Since the power train is mounted on the front side in a large majority of mass-production type vehicles, the present system is desirably mounted on rear wheels because of space restriction. However, the embodiment is not always limbed to this structure.

The yaw moment control device 25 can generate any yaw moment by controlling a motor of the yaw moment control mechanism. Accordingly, the integrated control device 1 can cause the yaw moment control device 25 to generate a desired target yaw moment by sending the target yaw moment to the steering control device 8.

Figure 10:
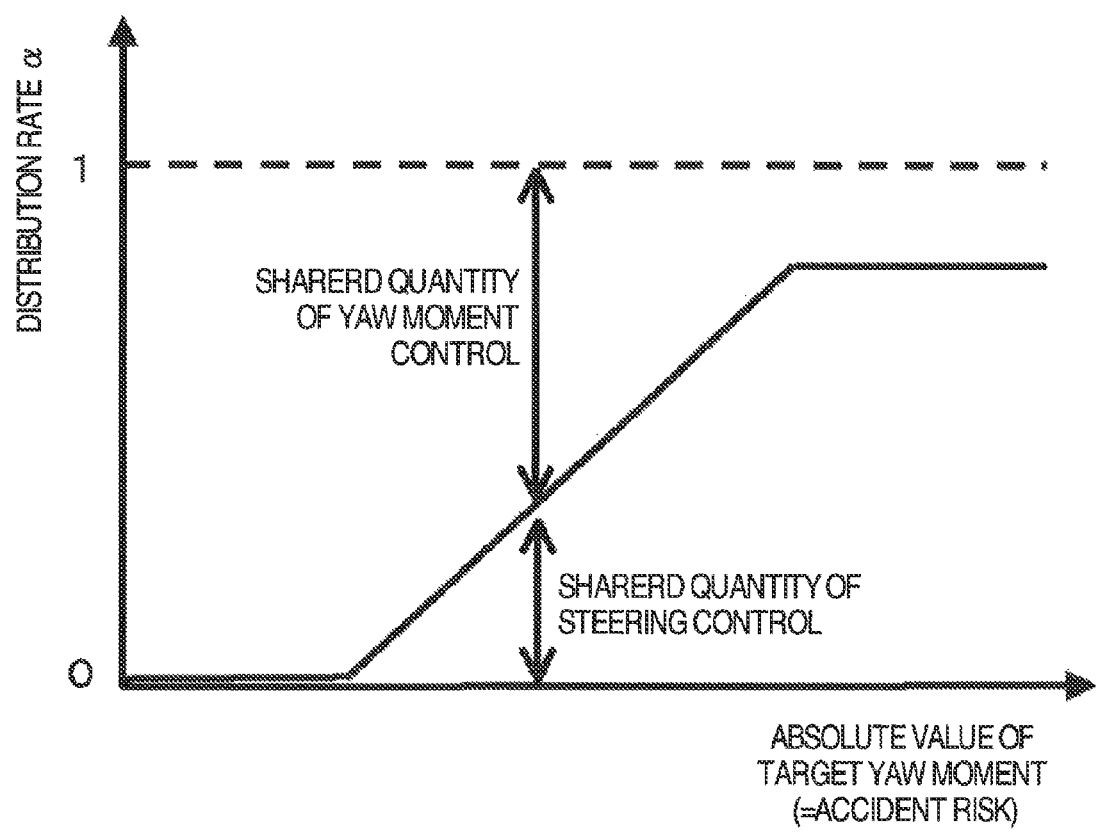
FIG. 10 is a diagram showing a distribution ratio of a target yaw moment in Embodiment 2.

The flowchart is the same as that of FIG. 2 except for replacement of the brake control device with the yaw moment control device, and the description of the flowchart will be omitted. Distribution of the target yaw moment is calculated by expressions in which the yaw moment control device is substituted for the brake control device in the expressions (2) and (3). The distribution of the target yaw moment, as shown in FIG. 10, increases the rate of the target yaw moment of the steering control device 8 to the target yaw moment of the yaw moment control device 25 as the absolute value of the target yaw moment increases. By doing so, the target yaw moment can be distributed to the yaw moment control device 25 when the accident risk is small as in a departure from a lane as shown in FIG. 11A, that is, when, the absolute value of the target yaw moment is small. On the other hand, as shown in FIG. 11B, when the accident risk is large as in avoidance of a collision with the parked vehicle, that is, when the absolute value of the target yaw moment is large, the rate of the target yaw moment to the steering control device 8 becomes large relative to when the accident risk is small. Based on the target yaw moment distributed as mentioned above, the steering control device 8 and the yaw moment control device 25 control the respective actuators to generate desired yaw moments.

In accordance with the foregoing description, the driving support device 101 can cause the yaw moment control device 25 to generate a yaw moment in lane departure the frequency of which, is high in daily life. As a result, the lane departure can be prevented while an uncomfortable feeling of steering due to steering control is reduced. On the other band, the rate of target yaw moment of steering control for the avoidance of collision with parked vehicle is increased, so that reliable collision avoidance can be realized. That is, the driving support device 101 can distribute the target yaw moment to the steering control device 8 and the yaw moment control device 25 suitably in accordance with the surrounding situation, thereby making compatible realization of reliable obstacle avoidance and reduction in uncomfortable feeling at lane departure.

Embodiment 3

In the following, Embodiment 3 will be described with reference to the drawings. The system configuration of Embodiment 3 will be described referring to the driving support device 101 shown in FIG. 1 on which the brake control device 15 is mounted, by way of example. However, the driving support device may mount thereon a driving force control device (not shown) and the yaw moment control device 25. Here are described only portions which differ from Embodiment 1 and the description of like portions will be omitted hereafter.

The flowchart in Embodiment 3 is like as that of Embodiment 1 except for the step 208 in FIG. 2. Distribution of the target yaw moment is calculated using the expressions (2) and (3).

Figure 12:
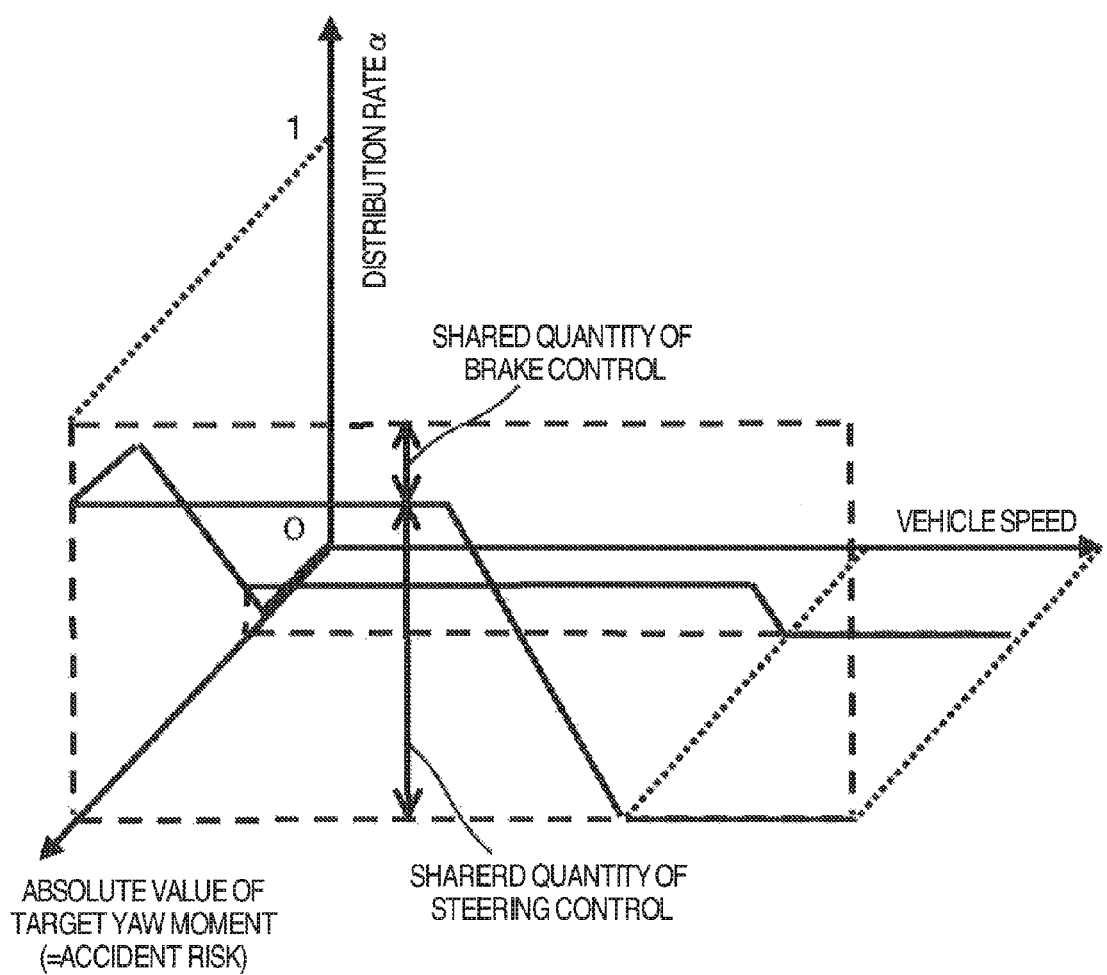
FIG. 12 is a diagram showing a distribution ratio of a target yaw moment in Embodiment 3.

Subsequently, description will be made of a distribution method of the target yaw moment. During a high-speed driving (for example, 120 km/h) if avoidance of a collision is tried by way of steering control, the behavior of the vehicle largely changes, so that the driver will suffer a feeling of fear seriously. On the other hand, during the high-speed driving, a high yaw rate can be generated to the yaw moment, as compared with that during a low-speed driving. That is, brake control can safely bring out a sufficient turning performance. In Embodiment 3, as shown n FIG. 12, the rate of target yaw moment of the brake control device 15 to the target yaw moment, of the steering control device 8 is made to increase as the driving speed of the vehicle increases.

As a result, as shown in FIG. 13A, when the vehicle is not driving at high speed (for example, 60 km/h), the distribution of the target yaw moment is like as in Embodiment 1, thereby realizing compatibility of reliable obstacle avoidance with realization of reduction of uncomfortable feeling at lane departure. On the contrary, when the vehicle is driving at high speed (120 km/h), as shown in FIG. 13B, the distribution rate of the target yaw moment to the brake control device is made larger as compared with the low-speed driving, thereby realizing a safe driving support device.

Embodiment 4

In the following description of Embodiment 4 will be made with reference to the drawings. The system configuration will be described of the driving support device 101 on which the brake control device 15 shown in FIG. 1 is mounted by way of example. However, in place of it, the driving support device may be one on which a driving force control device (not shown) and tire yaw moment control device 25 are mounted. Only portions which differ from those of Embodiment 1 will be described, and description of the like portions will be omitted hereafter.

The flowchart in Embodiment 4 is like as that of Embodiment 1 except for step S208 in FIG. 2. Distribution of the target yaw moment is calculated according to expressions (2) and (3).

Figure 14:
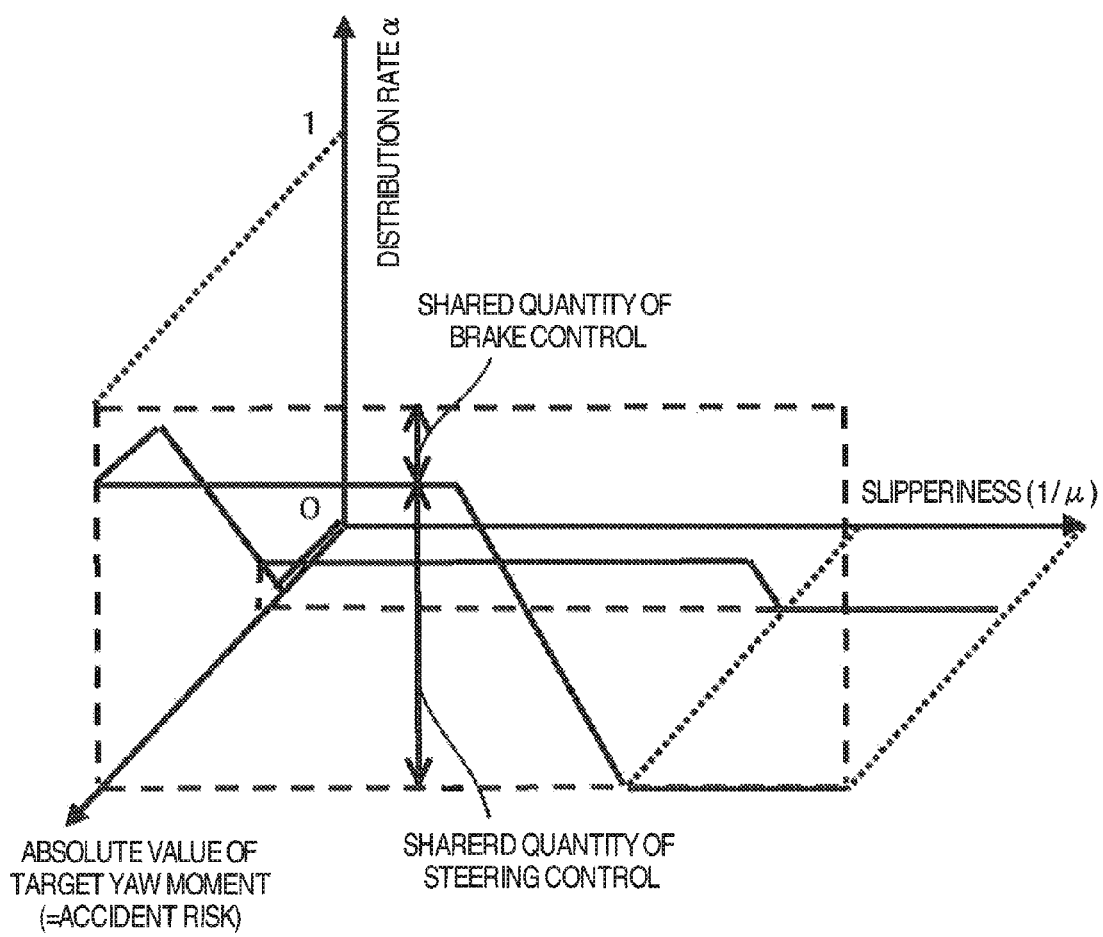
FIG. 14 is a diagram showing a distribution ratio of a target yaw moment in Embodiment 4.

Subsequently, description will be made of a distribution method of the target yaw moment. There is a possibility that if avoidance of a collision is made on a slippery road surface using steering control, over-steer is caused to disturb the behavior of vehicle largely. To solve the problem, in Embodiment 4, as shown in FIG. 14, the rate of target yaw moment of the brake control device 15 to that of the steering control device 8 is made to increase, as the road surface is more slippery (that is, the coefficient $\mu$ of friction of road surface becomes small).

Figure 15A:
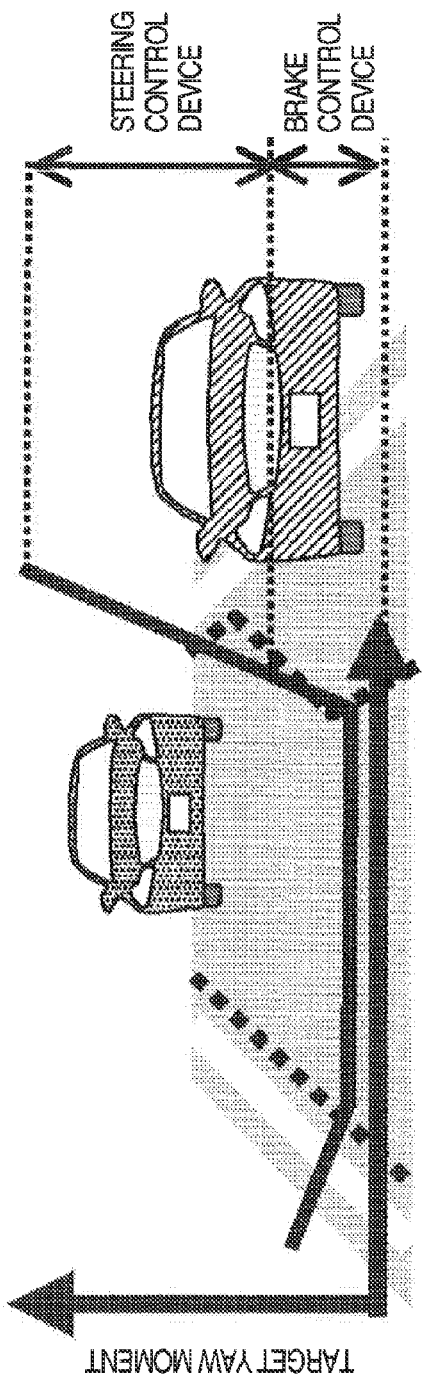
FIG. 15A shows a distribution of a target yaw moment when an accident risk on a difficult-to-slip road surface is large in Embodiment 4.
Figure 15B:
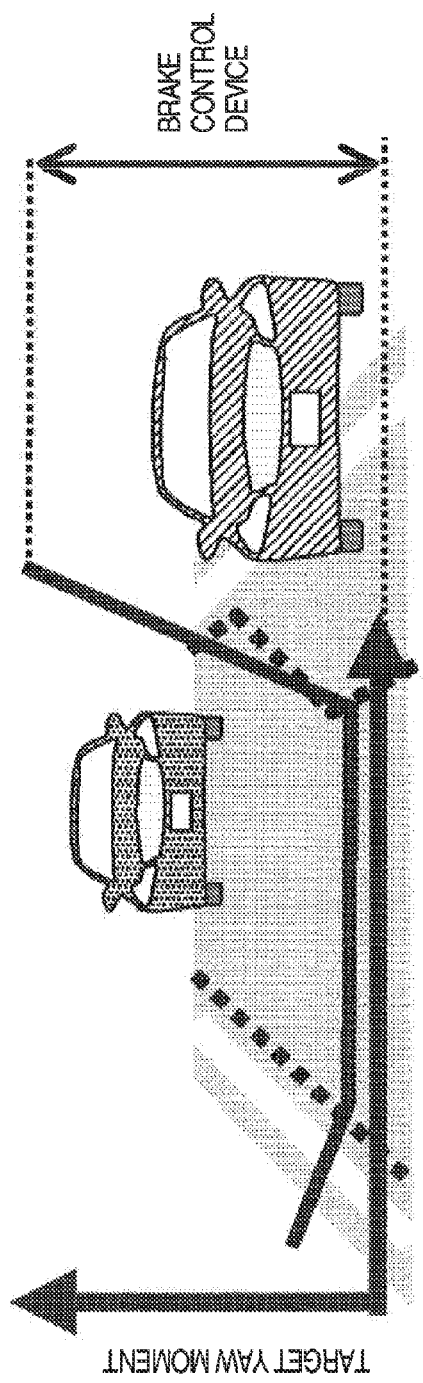
FIG. 15B shows a distribution of a target yaw moment when an accident risk on an easy-to-slip road surface is large in Embodiment 4.

As a result, as shown in FIG. 15A, when the road surface is not slippery, the distribution of the target yaw moment is like as in Embodiment 1, thereby realizing compatibility of reliable obstacle avoidance with realization of reduction of uncomfortable feeling at lane departure. On the contrary; when the road surface is slippery, as shown in FIG. 15B, the distribution rate of the target yaw moment to the brake control device is made larger compared with the case of non-slippery road surface, thereby realizing a safe driving support device.

In the foregoing, the description of the embodiments has been made. However, any specific configuration of the invention is not limited to the respective embodiments. Any changes of design or the like which do not depart from the gist of the invention will be included in the present invention.

It should be further understood by those skilled in the art that although the foregoing description has been made on embodiments of the invention, the invention is not limited thereto and various changes and modifications may be made without departing from the spirit, of the invention and the scope of the appended claims.

DESCRIPTION OF REFERENCE NUMERALS 1 integrated control device
2 sensors
6 handle
7 steering torque detector
8 steering control device
9 motor
10 steering control mechanism
12 brake pedal
13 brake control mechanism
14 combined sensor
15 brake control device
16FL to 16RR wheel cylinders
17 accelerator pedal
18 stroke sensor
19 engine control device
21 steering angle detector
22FL to 22RR wheel speed sensors
24 yaw moment control mechanism
25 yaw moment control device
101 driving support device

The invention claimed is:

1. A driving support device comprising:
a detection unit for detecting a driving state of a vehicle, a position of a lane marker, and positions and types of obstacles around said vehicle;
a calculation unit for calculating, based on said driving state of the vehicle, said position of the lane marker, and said positions and types of the surrounding obstacles, a target yaw moment; and
a distribution unit for distributing, based on at least one of said driving state of the vehicle, said position of the lane marker, and said positions and types of the surrounding obstacles, said target moment to a first actuator for controlling a driving/braking force and a second actuator for controlling a steering,
wherein said calculation unit calculates an accident risk, based on the position of said lane marker, and the positions and types of said obstacles around the vehicle,
said distribution unit has, based on said accident risk, a case that said target yaw moment is distributed so as to operate only said first actuator, and a case that said target yaw moment is distributed so as to operate said first actuator and said second actuator, and
said distributed target yaw moments have a same direction, and are different only in size, based on said accident risk.

2. The driving support device defined in claim 1, wherein said first actuator defines at least one of a brake control device, a driving force control device and a yaw moment control device, and said second actuator defines a steering control device.

3. The driving support device defined in claim 1, wherein said driving state of the vehicle is at least one of a steering angle, a vehicle speed and the state of a driving road surface.

4. The driving support device defined in claim 1, wherein said calculation unit
calculates an accident risk based on said lane marker and said surrounding obstacles,
defines a virtual line by which said vehicle can drive safely, based on said accident risk, and
calculates said target yaw moment based on a relative relation between said virtual line and said vehicle.

5. The driving support device defined in claim 2, wherein said distribution unit increases a distribution of the target yaw moment of said steering control device to the target yaw moment of said brake control device, said driving force control device or said yaw moment control device, as the absolute value of said target yaw moment increases.

6. The driving support device defined in claim 4, wherein said distribution unit increases the distribution of the target yaw moment of said steering control device to the target yaw moment of said brake control device, said driving force control device or said yaw moment control device, as said accident risk increases.

7. The driving support device defined in claim 1, wherein said calculation unit calculates a target yaw moment required for prevention of the departure from the lane marker and the collision with obstacles, and changes the distribution of the controlling actuators in accordance with the relevant target yaw moment.

8. The driving support device defined in claim 2, wherein said distribution unit increases the distribution of the target yaw moment of said brake control device to the target yaw moment of said steering control device, said driving force control device or said yaw moment control device, as the speed of the vehicle increases.

9. The driving support device defined in claim 2, wherein said distribution unit increases the distribution of the target yaw moment of said brake control device to the target yaw moment of said steering control device, said driving force control device or said yaw moment control device, as the road surface is slippery.

10. The driving support device defined in claim 1, wherein a maximum value of the target yaw moment of each actuator is set so as not to exceed a generation capability of yaw moment of each actuator.

11. The driving support device defined in claim 4, wherein a control gain is set in accordance with the accident risk at the departure from the lane marker and the accident risk at the collision with the obstacles.

12. The driving support device defined in claim 2, wherein said driving state of the vehicle is at least one of a steering angle, a vehicle speed and the state of a driving road surface.

13. The driving support device defined in claim 2, wherein said calculation unit
calculates an accident risk based on said lane marker and said surrounding obstacles,
defines a virtual line by which said vehicle can drive safely, based on said accident risk, and
calculates said target yaw moment based on a relative relation between said virtual line and said vehicle.

14. The driving support device defined in claim 3, wherein said calculation unit
- calculates an accident risk based on said lane marker and said surrounding obstacles,
- defines a virtual line by which said vehicle can drive safely, based on said accident risk, and
- calculates said target yaw moment based on a relative relation between said virtual line and said vehicle.

15. The driving support device defined in claim 3, wherein said distribution unit increases a distribution of the target yaw moment of said steering control device to the target yaw moment of said brake control device, said driving force control device or said yaw moment control device, as the absolute value of said target yaw moment increases.

16. The driving support device defined in claim 4, wherein said distribution unit increases a distribution of the target yaw moment of said steering control device to the target yaw moment of said brake control device, said driving force control device or said yaw moment control device, as the absolute value of said target yaw moment increases.

17. The driving support device defined in claim 2, wherein said calculation unit calculates a target yaw moment required for prevention of the departure from the lane marker and the collision with obstacles, and changes the distribution of the controlling actuators in accordance with the relevant target yaw moment.

18. The driving support device defined in claim 3, wherein said calculation unit calculates a target yaw moment required for prevention of the departure from the lane marker and the collision with obstacles, and changes the distribution of the controlling actuators in accordance with the relevant target yaw moment.

19. The driving support device defined in claim 4, wherein said calculation unit calculates a target yaw moment required for prevention of the departure from the lane marker and the collision with obstacles, and changes the distribution of the controlling actuators in accordance with the relevant target yaw moment.

20. The driving support device defined in claim 3, wherein said distribution unit increases the distribution of the target yaw moment of said brake control device to the target yaw moment of said steering control device, said driving force control device or said yaw moment control device, as the speed of the vehicle increases.

* * * * *